United States Patent [19]

Groves et al.

[11] Patent Number: 5,113,508
[45] Date of Patent: May 12, 1992

[54] DATA CACHE INITIALIZATION

[75] Inventors: Randall D. Groves; David P. Tuttle, both of Austin, Tex.

[73] Assignee: International Business Machines Corporation, Armonk, N.Y.

[21] Appl. No.: 681,616

[22] Filed: Mar. 29, 1991

Related U.S. Application Data

[63] Continuation of Ser. No. 165,219, Mar. 8, 1988, abandoned.

[51] Int. Cl.$^5$ .................... G06F 13/00; G06F 12/00
[52] U.S. Cl. .................... 395/425; 364/DIG. 1; 364/243; 364/243.4; 364/243.41; 364/240; 364/240.1; 364/240.2; 364/240.3; 365/230.02
[58] Field of Search ... 364/200 MS File, 900 MS File; 365/230.02

[56] References Cited

U.S. PATENT DOCUMENTS

| | | | |
|---|---|---|---|
| 3,972,028 | 7/1976 | Weber et al. | 364/200 |
| 3,982,231 | 9/1976 | Bernstein et al. | 340/172.5 |
| 4,092,728 | 5/1978 | Baltzer et al. | 364/900 |
| 4,195,341 | 3/1980 | Joyce | 364/200 |
| 4,236,207 | 11/1980 | Rado et al. | 364/200 |
| 4,365,295 | 12/1982 | Katzman et al. | 364/200 |
| 4,460,959 | 7/1984 | Lemay et al. | 364/200 |
| 4,488,224 | 12/1984 | Ippolito et al. | 364/200 |
| 4,621,320 | 11/1986 | Holste et al. | 364/200 |
| 4,831,513 | 5/1989 | Kanazawa | 364/200 |
| 4,954,946 | 9/1990 | Natusch et al. | 364/200 |
| 4,975,831 | 12/1990 | Nilsson et al. | 364/200 |

FOREIGN PATENT DOCUMENTS

0049387 9/1981 European Pat. Off. .

OTHER PUBLICATIONS

Digital Logic Handbook, 1971, pp. 158 and 159.
IBM Technical Disclosure Bulletin, vol. 24, No. 4, Sep. 1981, p. 1852, entitled "Exclusive or Performance Enhancement".
IBM Technical Disclosure Bulletin, vol. 17, No. 7, Dec. 1974, "Automatic Partial Deletion of High-Speed Buffer Entries", pp. 2038-2039.

*Primary Examiner*—Michael R. Fleming
*Assistant Examiner*—Gopal C. Ray
*Attorney, Agent, or Firm*—Thomas E. Tyson

[57] ABSTRACT

A data processing system including a data cache with the capability to selectively zero the contents of the data cache. The invention includes a multiplexor arranged to provide a parallel data output that is greater than the parallel data input from either a central processing unit or from a memory that are each connected to access the data cache. This multiplexor is selectively controlled to provide a parallel data output of zeroes upon the decoding of a specific zeroing instruction.

15 Claims, 3 Drawing Sheets

DATA CACHE INITIALIZATION

This is a continuation of application Ser. No. 07/165,219 filed Mar. 8, 1988 now abandoned.

DESCRIPTION

1. Technical Field

This invention relates to data processing systems and more specifically to initializing an information storage device for data processing systems.

2. Background Art

A data processing system includes a central processing unit and a memory. The memory contains instructions to direct the central processing unit to perform computations upon data. This data is stored in the memory. Data in memory can also be temporarily stored in a storage device termed a cache.

In systems where several processors are using the same cache or where several programs within a single CPU are using the same cache, it becomes necessary to insure that the data placed in a memory and/or a cache by one processor or program is not used unintentionally by another processor or program. Therefore, it is common to initialize a memory and/or a cache by loading zeroes into the memory and/or the cache before a processor or program begins to use the memory and/or the cache for storage.

It is an object of the present invention to provide an apparatus for quickly initializing the contents of a data cache.

SUMMARY OF THE INVENTION

In accordance with the present invention, a data processing system is provided that includes an instruction decoding circuit for decoding data processing system instructions and providing control signals in response to the decoding of these instructions. This system further includes a memory for storing information. The memory is connected to a multiplexor that provides information from either a bus or information of a predetermined value to the memory in response to control signals from the instruction decoding circuit.

In the preferred embodiment, a single instruction is provided that is decoded by the instruction decoding circuitry to provide a control signal to the multiplexor to load the information of a predetermined value (zeroes) to the memory.

In another embodiment, a data processing system is provided that includes a memory, a memory bus having a first plurality of memory bus lines connected to the memory, a central processing unit, a central processing unit bus including a second plurality of CPU bus lines connected to the central processing unit, a data cache connected to the memory bus lines and to the CPU bus lines, and a control circuit that selectively provides information from either the memory bus lines or the CPU bus lines to the data cache. The control circuit further includes means for providing information of a predetermined value through the memory bus lines to the data cache. In this preferred embodiment, this additional means is a multiplexor. The multiplexor is connected to the memory bus to either provide the information from the memory bus or the predetermined value to the data cache.

BRIEF DESCRIPTION OF THE DRAWING

The novel features believed characteristic of the invention set forth in the appended claims. The invention itself, however, as well as the other features and advantages thereof, will be best understood by reference to the detailed description which follows, read in conjunction with the accompanying drawings, wherein:

BEST MODE FOR CARRYING OUT THE INVENTION

This invention relates to a mechanism for initializing a series of memory locations and more specifically for quickly initializing portions of a data cache memory. The data cache memory, in this invention, is used for temporary storage of data that is being transferred from a system memory 8 to a central processing unit 6 or from the central processing unit 6 to the memory 8.

Figure 1:
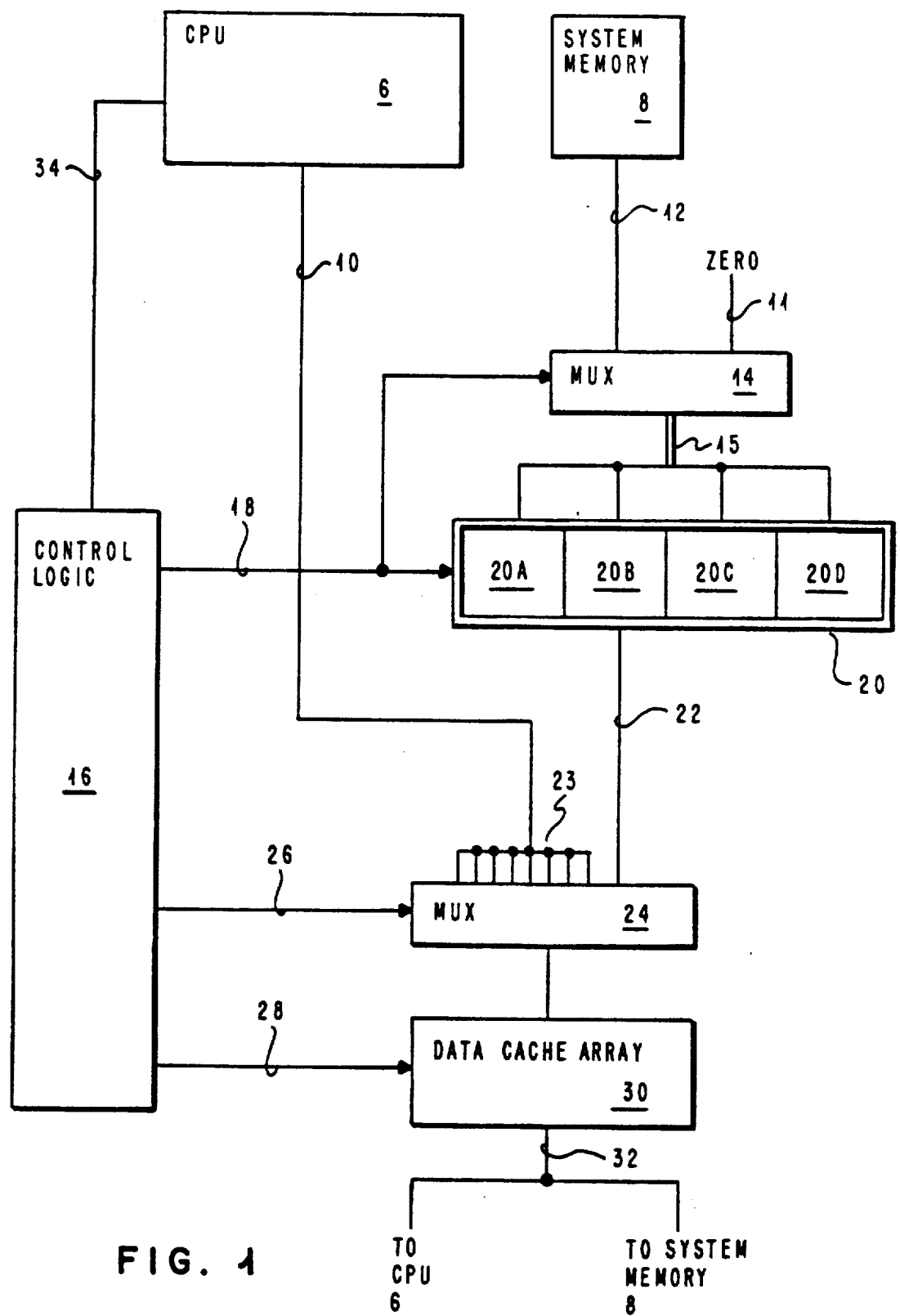
FIG. 1 is a block diagram of the data processing system.

FIG. 1 is a block diagram of a data processing system including a data cache array 30. In FIG. 1, the CPU 6 is connected by a bus 10 through a multiplexor 24 to the data cache array 30. System memory 8 is connected by a bus 12 through multiplexor 14 to a second bus 15 to a data cache reload buffer 20.

The Cache Reload Buffer 20 is connected by bus 22 to the Multiplexer 24 to the data cache array 30. In operation, the bus 10 from the CPU 6 provides 8 bytes in parallel. This 8 byte bus 10 is replicated 8 times to create 64 byte input 23 to Multiplexer 24. In other words, if a hexadecimal value of "A5" was place on the bus 10, input 23 would have the value "A5A5A5A5A5A5A5A5". Bus 12 from system memory 8 provides 16 bytes in parallel to Multiplexer 14. Multiplexer 14 further includes input 11 which has as its value zero by providing a logic value of zero by tying each of the bit lines to a ground or to a positive voltage, depending upon whether positive or negative logic is being employed. The output of Multiplexer 14 is replicated 4 times to create the 64 byte parallel bus 15. Additionally, multiplexer 14 with input 11 provides 64 bytes of zeroes in parallel on bus 15. The 64 byte bus 15 provides either the 16 byte bus 12 replicated 4 times to each of the four sections of Cache Reload Buffer 20 or 64 bytes of zero.

Bus 15 presents the data to all four sections of Cache Reload Buffer 20. When input 11 to Multiplexer 14 is selected, bus 15 will contain 64 parallel bytes of zeroes. The Cache Reload Buffer 20 contains four storage sections 20A, 20B, 20C and 20D a total of 64 bytes in width. The output of the cache reload buffer 20 onto bus 22 is 64 bytes in parallel. The cache reload buffer 20 serves to temporarily store data from system memory 8 or zeroed data before it is loaded into the data cache array 30. The four parts 20A, 20B, 20C and 20D of cache reload buffer 20 can be individually or simultaneously written. The operation of both Multiplexer 14 and the cache reload buffer 20 is controlled by the control logic 16 via lines 18. Lines 18 provide control to the Multiplexer 14 to determine the information source, i.e., bus 12 or zeroes on input 11. Additionally, the information on control lines 18 specify which of the four sections 20A, 20B, 20C and 20D of Cache Reload Buffer 20 the 16 bytes from bus 12 are to be stored.

During one type of operation, unique data received from system memory during four consecutive system cycles is stored in the four different sections 20A, 20B, 20C and 20D of Cache Reload Buffer 20, filling Cache Reload Buffer 20. During a second type of operation, control logic 16 can also select all four sections of Cache Reload Buffer 20 to receive the data from bus 15. This occurs only when Multiplexer 14 input 11 is selected. When this is done, all four sections 20A, 20B, 20C and 20D of Cache Reload Buffer 20 receive the value of zero simultaneously.

Bus 10 from CPU 6 is replicated 8 times to create a 64 byte input 23 to Multiplexer 24. Multiplexer 24 receives 64 bytes at input 23 (bus 10's data repeated) and 64 bytes on bus 22. Control logic 16 controls Multiplexer 24 via lines 26. During the operation of interest, the bus 22 input of Multiplexer 24 is selected by lines 26, thus presenting the 64 byte output of cache reload buffer 20 to the data cache array 30.

The data cache array 30 includes 256 lines (physical rows) of 64 bytes in parallel. Within each line, each byte of the 64 bytes is individually addressable through control lines 28 from control logic 16. Additionally, the control lines 28 provide for the data cache 30 to output on bus 32, 64 bytes in parallel.

Control logic 16 operates in response to the decoding of instructions in the CPU 6. As an instruction is decoded in CPU 6, signals are provided on line 34 to the control logic 16 to properly operate data cache 30 and associated hardware. The control logic 16 regulates loading the data cache 30 from either the CPU 6 or the system memory 8 or zeroing a line in the data cache.

Figure 2:
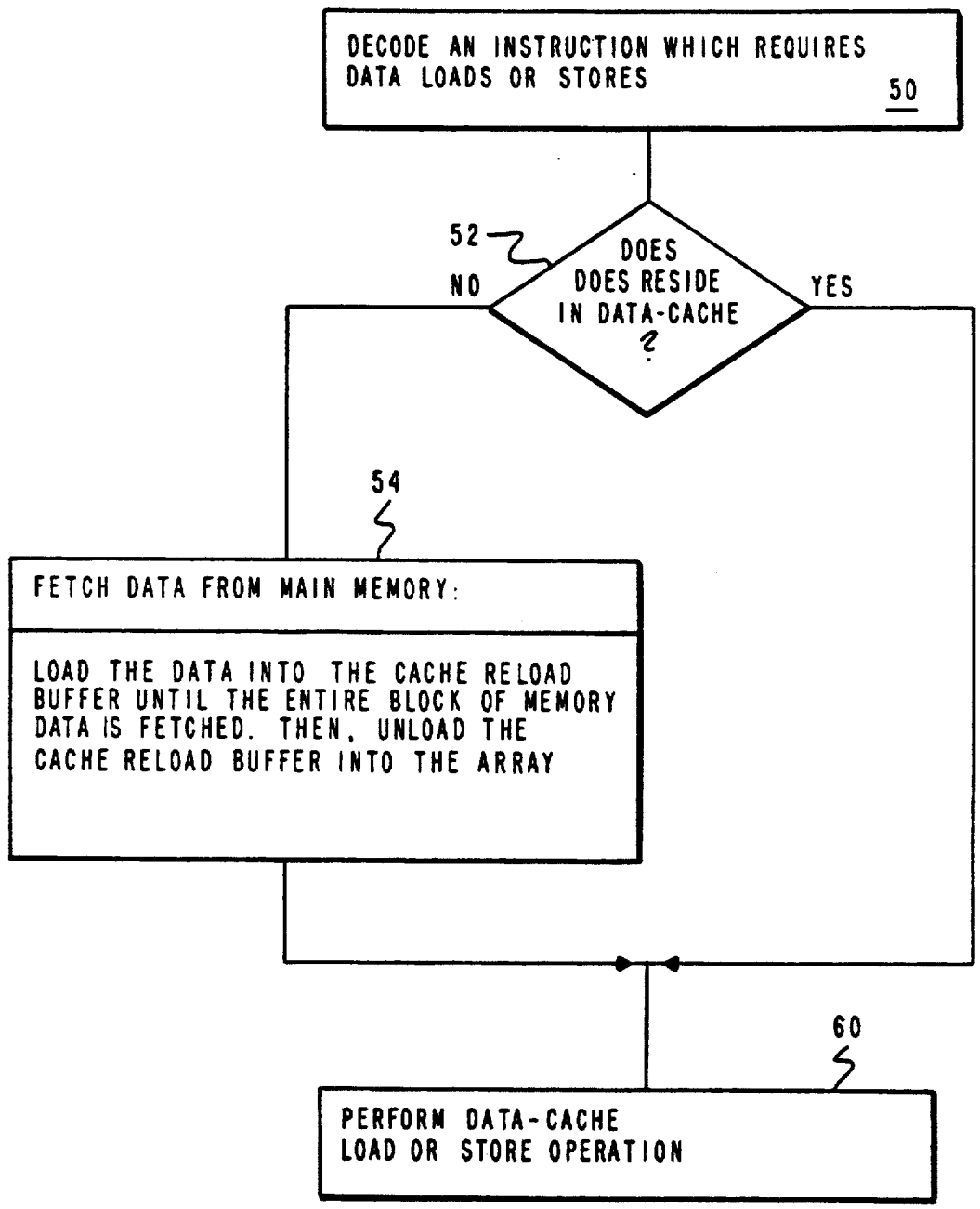
FIG. 2 is a flow chart illustrating the normal reloading of the data cache.

Referring to FIG. 2, the instructions which affect data cache operation are ones which require CPU 6 to read or write data from or to the data cache array 30, i.e., LOAD or STORE instructions. Referring to FIG. 2, step 50, a LOAD or STORE instruction is first decoded in the CPU. In FIG. 2, step 52, the CPU 6 verifies whether the data to be read or written is in the data cache array 30. This verification is done by comparing the address associated with the data reference in the instruction with a directory of the existing contents of the data cache array 30. If it does not already reside in data cache array 30, it must be fetched from system memory 8 in step 54, in a process called a Data Cache Reload. This consists of loading data from system memory 8 over bus 12 thru Multiplexer 14 and bus 15 to Cache Reload Buffer 20. During four consecutive system cycles data is stored in the four different sections of 20A, 20B, 20C and 20D and Cache Reload Buffer 20, filling Cache Reload Buffer 20. Once Cache Reload Buffer 20 is filled, the contents of Cache Reload Buffer 20 is then presented on bus 22 and the output of Multiplexer 24.

Control logic 16 signals via lines 28 the data cache array 30 to receive and store the data from Cache Reload Buffer 20. The process then proceeds to step 60.

Returning to step 52, if the data does reside in the data cache, then the process proceeds directly to step 60. In step 60, the information is fetched from the data cache array 30 and provided to CPU 6 in the case of a LOAD, or stored into the data cache array 30 from the CPU 6 in the case of a STORE instruction.

Figure 3:
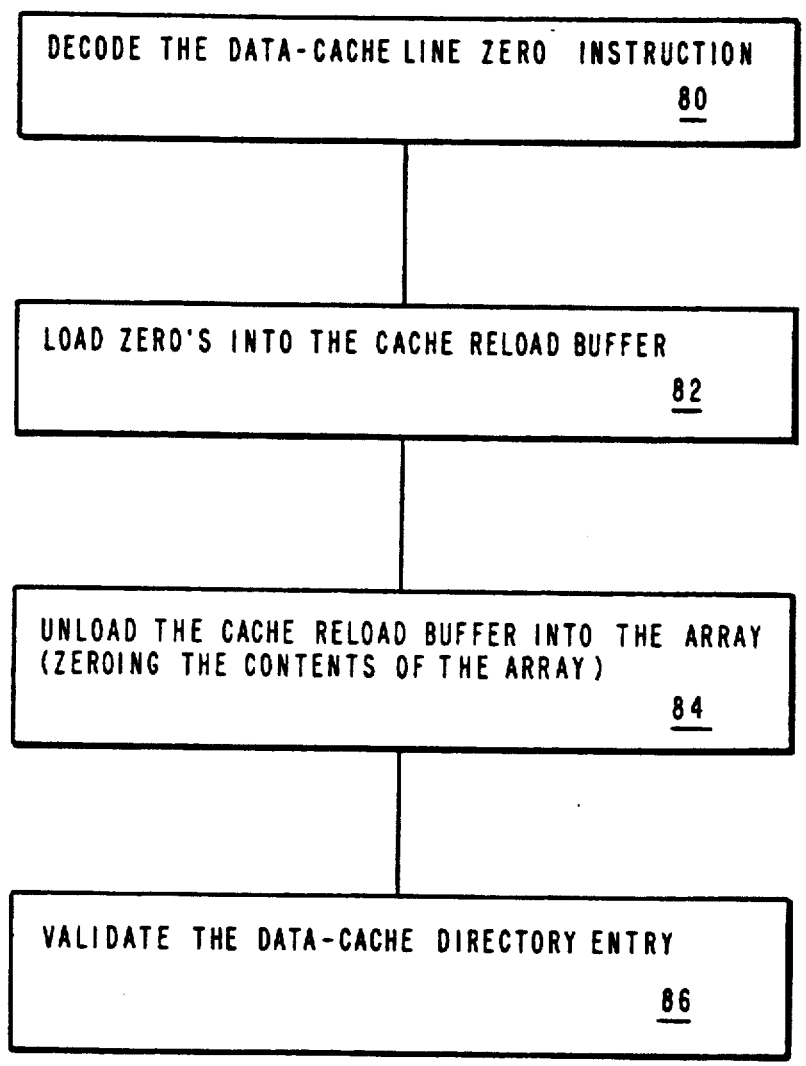
FIG. 3 is a flow chart illustrating the zeroing of a data cache line.

FIG. 3 illustrates a flow chart detailing the operation of the control circuitry in FIG. 1 for a line zero operation. In FIG. 3 step 80, the instruction that zeroes the line in the data cache array 30 is decoded in CPU 6. The data address indicated by instruction will be zeroed in the data cache array 30. This information is provided to the control logic 16 via lines 34. In step 82, the zeroes from line 11 (FIG. 1) are loaded thru Multiplexer 14 onto bus 15 into the Cache Reload Buffer 20. In step 84, the contents of the Cache Reload Buffer 20 are then loaded thru bus 22 and Multiplexer 24 into the line specified in the data cache array 30. In step 86, a flag is set in the directory which resides in CPU 6. This flag indicates that the data to be accessed by the given data reference address is now in the data cache array 30. In this manner, large portions of the cache can be initialized.

While the invention has been described in reference to the illustrated embodiment, this description is not intended to be construed in a limiting sense. Various modification of the illustrated embodiment as well as other embodiments of the invention will become apparent to those persons skilled in the art upon reference to this description. It is, therefore, contemplated that these appended claims will cover any such modifications or embodiments as fall within the true scope of the invention.

We claim:

1. A storing device connected to a central processor, said storing device comprising:
   a storing means for storing words, each in addressable locations and connected to a first bus means for parallel transfer of a single word to an addressable location and said storing means connected to a second bus means for parallel transfer of at least two words;
   a control means connected to said storing means and said central processor for directing information from said first bus into one of the addressable locations upon receiving a first processor signal or, in response to a second processor signal, for directing said storing means to store a predetermined constant value from said second bus means in at least two addressable locations concurrently; and
   a multiplexer means for providing information either from said first bus means or said second bus means to said storing means in response to control signals from said control means.

2. A storing device according to claim 1 wherein said first plurality of bus lines is less than said second plurality of bus lines.

3. A storing device according to claim 4 wherein said information of a predetermined constant value includes bits of identical binary values.

4. A storing device according to claim 3 wherein said information of a predetermined constant value includes bits of binary zeroes.

5. A data processing system comprising:
   instruction decoding means for decoding data processing system instructions and providing control signals in response thereto;
   memory means for storing information in addressable locations; and
   multiplexer means for connecting, in response to a first control signal, a first bus to said memory means and including a first plurality of bus lines providing parallel transfer of a single word to an addressable location, or, in response to a second control signal, a second bus of a second plurality of bus lines providing parallel transfer of at least two words of a predetermined constant value to at least two addressable locations of said memory means concurrently.

6. A data processing system according to claim 5 wherein said first plurality of bus lines is less than said second plurality of bus lines.

7. A data processing system according to claim 6 wherein said information of a predetermined constant value includes bits of identical binary values.

8. A data processing system according to claim 7 wherein said information of a predetermined constant value includes bits of binary zeroes.

9. A data processing system comprising:
a memory having instructions and data stored in addressable locations each containing a first plurality of bits;
a memory bus including a first plurality of bus lines connected to said memory;
a central processing unit (CPU) for executing instructions and providing CPU signals;
a central processing unit bus including a second plurality of bus lines connected to said central processing unit;
a data cache having a third plurality of addressable locations connected to said memory bus and said CPU bus; and
control means for selectively providing data information from either said memory bus or said CPU bus to addressed locations in said data cache in response to a first CPU signal, said control means including means for providing, in response to a second CPU signal, of a predetermined constant value through said memory bus lines to said data cache to at least two addressable locations concurrently.

10. A data processing system according to claim 9 wherein said information of a predetermined constant value includes bits of identical binary values.

11. A data processing system according to claim 10 wherein said information of a predetermined constant value includes bits of binary zeroes.

12. A data processing system comprising:
processor means for executing instructions and providing control signals in response thereto;
means, connected to said processor means, for providing data on a first bus;
said first bus connected to said processor means and having a first plurality of bus lines;
a memory means for storing data in addressable locations;
means, connected to said memory means, for providing data to a second bus;
said second bus connected to said memory means and having a second plurality of bus lines;
a third bus connected to a means for providing data having a constant value and having a third plurality of bus lines;
a first multiplexer means for concurrently providing either a second plurality of bits from said second bus or a third plurality of bits from said third bus to a buffer in response to said processor means control signals; and
a second multiplexer means for concurrently providing either information from said first bus or said buffer to a data cache in response to said processor means control signal.

13. A data processing system according to claim 12 wherein said third plurality of bus lines containing information of a predetermined constant value includes a greater number of bus lines than either said first or said second bus lines.

14. A data processing system according to claim 13 wherein said information of a predetermined constant value includes bits of identical binary values.

15. A data processing system according to claim 14 wherein said information of a predetermined constant value includes bits of binary zeroes.

* * * * *

UNITED STATES PATENT AND TRADEMARK OFFICE
CERTIFICATE OF CORRECTION

PATENT NO. : 5,113,508

DATED : May 12, 1992

INVENTOR(S) : Randall D. Groves and David P. Tuttle

It is certified that error appears in the above-identified patent and that said Letters Patent is hereby corrected as shown below:

Col. 4, line 49, please delete "4" and substitute therefor --2--.

Signed and Sealed this

Seventeenth Day of August, 1993

*Attest:*

BRUCE LEHMAN

*Attesting Officer*   Commissioner of Patents and Trademarks